(12) United States Patent
Mitsutani (10) Patent No.: US 7,096,663 B2
(45) Date of Patent: Aug. 29, 2006

(54) AIR-FUEL RATIO CONTROL APPARATUS FOR INTERNAL COMBUSTION ENGINE

(75) Inventor: Noritake Mitsutani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 142 days.

(21) Appl. No.: 10/823,710

(22) Filed: Apr. 14, 2004

(65) Prior Publication Data
US 2004/0209734 A1 Oct. 21, 2004

(30) Foreign Application Priority Data
Apr. 15, 2003 (JP) ............................ 2003-110420

(51) Int. Cl.
*F01N 3/00* (2006.01)
(52) U.S. Cl. .......................................... 60/285; 60/277
(58) Field of Classification Search ................. 60/276, 60/285, 277
See application file for complete search history.

(56) References Cited

U.S. PATENT DOCUMENTS

| | | | |
|---|---|---|---|
| 5,875,628 A * | 3/1999 | Mitsutani | ..................... 60/276 |
| 6,227,033 B1 | 5/2001 | Kainz | ........................ 73/23.32 |
| 2002/0038544 A1 | 4/2002 | Ikemoto et al. | ............... 60/285 |

FOREIGN PATENT DOCUMENTS

| | | |
|---|---|---|
| JP | 61-028739 | 2/1986 |
| JP | 06-286503 | 10/1994 |
| JP | 06-307274 | 11/1994 |
| JP | 08-284715 | 10/1996 |
| JP | 08284715 A * | 10/1996 |
| JP | 09-068077 | 3/1997 |
| JP | 09-292019 | 11/1997 |
| JP | 2001-059412 | 3/2001 |
| JP | 2001-090583 | 4/2001 |

* cited by examiner

*Primary Examiner*—Thomas Denion
*Assistant Examiner*—Loren Edwards
(74) *Attorney, Agent, or Firm*—Kenyon & Kenyon LLP (57) ABSTRACT

In an exhaust system of an internal combustion engine, an air-fuel ratio sensor is located upstream of a three-way catalyst. An oxygen sensor is located downstream of the catalyst. An ECU performs feedback control of the amount of fuel based on output of the air-fuel ratio sensor such that the engine air-fuel ratio seeks a stoichiometric air-fuel ratio. The ECU also performs sub-feedback control for correcting the amount of fuel in the feed back control based on output of the oxygen sensor. The ECU learns a learning value for compensating for a stationary difference between the engine air-fuel ratio and the stoichiometric air-fuel ratio based on a sub-feedback correction value. When learning of the learning value is performed after the learning value is cleared, a slip control by a lockup clutch is inhibited until the learning is stabilized.

8 Claims, 9 Drawing Sheets

| Sub-F/B Learning Stabilization Flag | ON | OFF |
|---|---|---|
| \|Upper Limit Value t_fsfbgh\| | Small | Great |
| \|Lower Limit Value t_fsfbgl\| | Small | Great |
| \|Proportional Gain Kvp\| | Small | Great |
| \|Integral Gain Kvp\| | Small | Great |

Fig.12 (Prior Art)

AIR-FUEL RATIO CONTROL APPARATUS FOR INTERNAL COMBUSTION ENGINE

BACKGROUND OF THE INVENTION

The present invention relates to an internal combustion engine having a three-way catalyst in an exhaust passage, which catalyst is capable of storing oxygen. More particularly, the present invention pertains to an air-fuel ratio control apparatus for an internal combustion engine, which apparatus performs feedback control for optimizing the air-fuel ratio of combustible gas mixture supplied to the engine.

A three-way catalyst is conventionally used in a vehicle internal combustion engine to clean exhaust gas by simultaneously oxidizing unburned component (HC, CO) in the exhaust gas and reducing nitrogen oxide (NOx) in the exhaust gas. Such a three-way catalyst, which is capable of storing oxygen, cleans exhaust gas by adsorbing excessive oxygen in exhaust gas when the air-fuel ratio is lean, and by releasing oxygen that compensates for a shortage of oxygen in the exhaust gas when the air-fuel ratio is rich. To improve the oxidation and reduction performance of such a three-way catalyst, an air-fuel ratio (A/F), which represents the combustion state of an internal combustion engine, needs to be controlled such that the air-fuel ratio is in the vicinity of the stoichiometric air-fuel ratio (window). Therefore, an oxygen sensor is provided in an exhaust passage for detecting whether the air-fuel ratio is richer or leaner than the stoichiometric air-fuel ratio based on the concentration of oxygen remaining in the exhaust gas. In a typical fuel injection control of an internal combustion engine, an air-fuel ratio feedback (F/B) control is performed, in which the amount fuel is corrected based on the output of the oxygen sensor.

However, since exhaust from cylinders is not sufficiently mixed at the confluence of an exhaust manifold, which is upstream of the three-way catalyst, the output of the sensor can fluctuate. Such fluctuations of the sensor output and deterioration of the sensor due to the heat of exhaust gas can degrade the control accuracy of the air-fuel ratio.

To solve the above problems, a double sensor system has been already been put to use. In a double sensor system, an additional oxygen sensor is provided downstream of a three-way catalyst. In addition to a main F/B control based on the detection result of air-fuel ratio detected by the upstream sensor, a sub-F/B control based on the detection result of air-fuel ratio by the downstream sensor is performed to improve the accuracy of the air-fuel ratio control.

In a double-sensor system, the sub-F/B control is performed based on the detection signal of the downstream oxygen sensor. To correct the fuel amount in the main F/B control, a sub-F/B correction value is computed. Based on the sub-F/B correction value, a sub-F/B learning control is performed. In the sub-F/B learning control, a learning value is computed. The computed learning value is used for compensating for a stationary difference between the stoichiometric air-fuel ratio and the engine air-fuel ratio, which stationary difference is based on the characteristics of the upstream sensor. The learning value is used in the sub-F/B control so that the engine air-fuel ratio seeks the stoichiometric air-fuel ratio. Accordingly, the exhaust emission is prevented from deteriorating.

Since a sub-F/B learning value is cleared when the supply of electricity from the battery is interrupted, learning of the sub-F/B needs to be quickly performed when the supply of electricity is resumed. Until the learning of the sub-F/B is performed in a stabilized manner, the control accuracy of the air-fuel ratio is lowered, and the exhaust emission thus deteriorates.

In order that the sub-F/B learning is stably performed, the output of the downstream sensor needs to be repeatedly switched between a value representing a rich air-fuel ratio and a value representing a lean air-fuel ratio during the execution of the sub-F/B control. Alternatively, the execution of the sub-F/B needs to be continued for a predetermined period of time or longer.

However, when a fuel cutoff (F/C) control is started in the internal combustion engine, the main F/B control and the sub-F/B control are not executed. At this time, if the three-way catalyst is not degraded and has a high oxygen storing property, the catalyst stores a significant amount of oxygen and is saturated. This causes the downstream oxygen sensor to detect a lean air-fuel ratio.

Therefore, even if the F/B control is performed to make the air-fuel ratio rich after the fuel cutoff control is stopped, the output of the downstream oxygen sensor is not easily switched from a value representing a lean air-fuel ratio to a value representing a rich air-fuel ratio because the three-way catalyst releases adsorbed oxygen. As a result, the sub-F/B learning value, which is computed based on the sub-F/B correction value in the sub-F/B control, does not have a proper value that the sub-F/B learning value should originally have.

A fluid transmission device having a lockup clutch is located between an internal combustion engine of an automobile and an automatic transmission. As disclosed in Japanese Laid-Open Patent Publication No. 9-292019, such a lockup clutch performs a deceleration lockup slip control when a vehicle is decelerating, thereby maintaining a slipping state between the automatic transmission and the internal combustion engine. Accordingly, the engine speed is maintained to or above the speed for the fuel cutoff (F/C). One of the reasons for engaging the lockup clutch in upshifting of the automatic transmission accompanying deceleration of the engine is to continue the fuel cutoff (F/C) as long as possible to maximize the improvement of the fuel economy.

If a three-way catalyst is placed in the exhaust passage of such an internal combustion engine and the air-fuel ratio F/B control is performed, frequent execution of the deceleration lockup slip control accompanying the fuel cutoff (F/C) causes the sub-F/B learning value to be unstable. Particularly, when a sub-F/B learning value is learned after the learning value is cleared, the execution of the fuel cutoff (F/C) control accompanying the deceleration lockup slip control prevents the sub-F/B learning from being performed.

Figure 12:
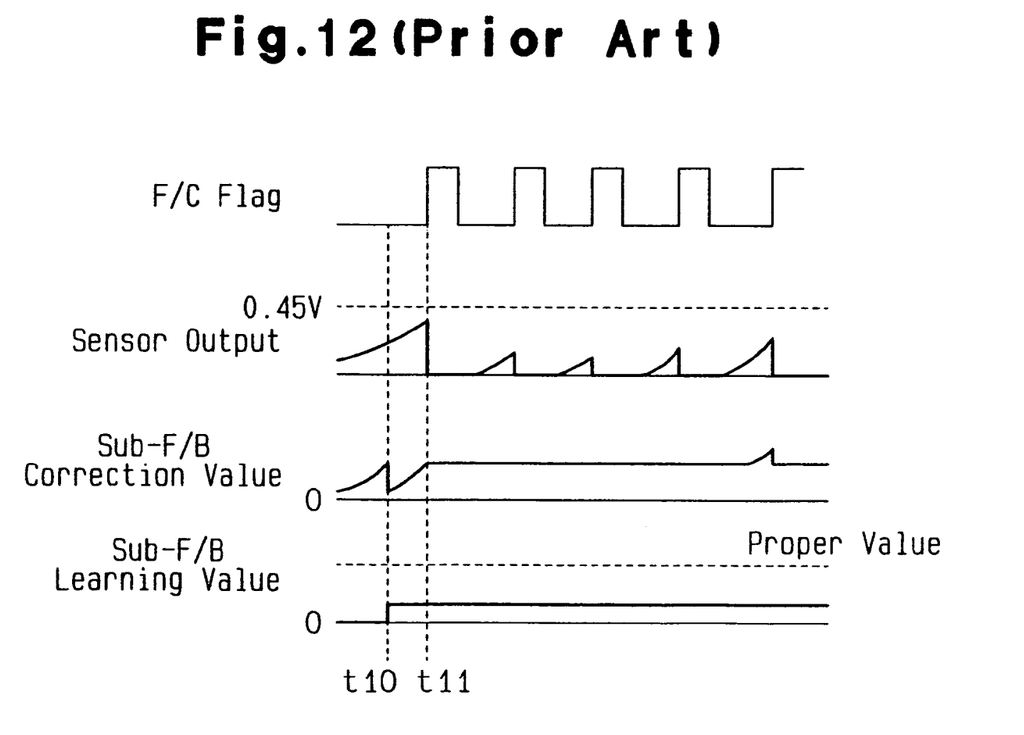
FIG. 12 is a timing chart showing a sub-F/B learning of the prior art.

That is, as shown in FIG. 12, when the execution of the sub-F/B control is continued for a predetermined period during the sub-F/B control at time t10, the sub-F/B learning is determined to be stable. Then, the sub-F/B learning value is renewed from an initial value (zero) by a predetermined amount based on the sub-F/B correction value. The sub-F/B correction value is reduced by an amount that corresponds to the correction amount of the sub-F/B learning value. During the deceleration lockup slip control, if the fuel cutoff control (F/C) is repeated in a short period after time t11, each execution of F/C causes the output of the oxygen sensors to seek a value representing a lean air-fuel ratio. Even if the air-fuel F/B control is resumed after the F/C is stopped, the output of the oxygen sensors will not change before a predetermined time elapses after the F/C is stopped because the three-way catalyst releases oxygen. Therefore, the sub-F/B correction value will not be renewed after time t11.

Further, since the F/C is repeated in a short period of time and the F/B control is not executed for a predetermined period or longer, the sub-F/B learning is not performed. Also, the sub-F/B learning value is not renewed after time t11. This causes the sub-F/B learning value to be a value different from a proper value that the sub-F/B learning value should originally has. Therefore, even if the main F/B control and the sub-F/B control are executed based on the learning value, the engine air-fuel ratio cannot be controlled to seek a value close to the stoichiometric air-fuel ratio. This can deteriorate the exhaust emission.

SUMMARY OF THE INVENTION

Accordingly, it is an objective of the present invention to provide an air-fuel ratio control apparatus for an internal combustion engine, which apparatus is capable of stabilizing a sub-feedback learning at an early stage after a sub-feedback learning value is cleared.

To achieve the foregoing and other objectives of the present invention, an air-fuel ratio control apparatus for an internal combustion engine of a vehicle is provided. The control apparatus includes an air-fuel ratio sensor and an oxygen sensor. The air-fuel ratio sensor is located upstream of a three-way catalyst in an exhaust system of the internal combustion engine. The air-fuel ratio sensor detects an engine air-fuel ratio based on a concentration of oxygen in exhaust gas. The oxygen sensor is located downstream of the three-way catalyst, and detects the engine air-fuel ratio based on the concentration of oxygen in exhaust gas. The control apparatus: performs feedback control of an amount of fuel based on output of the air-fuel ratio sensor such that the engine air-fuel ratio seeks a stoichiometric air-fuel ratio; performs sub-feedback control by computing a sub-feedback correction value based on output of the oxygen sensor, wherein the sub-feedback correction value corrects the fuel amount in the feedback control; learns a learning value based on the sub-feedback correction value, wherein the learning value is used for compensating for a stationary difference between the stoichiometric air-fuel ratio and the engine air-fuel ratio, which stationary difference is based on output characteristics of the air-fuel ratio sensor; stores the learning value; executes fuel cutoff control in a predetermined period; and inhibits the fuel cutoff control until the learning is stabilized when learning of the stored learning value is performed after the stored learning value is cleared.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An air-fuel ratio control apparatus for an internal combustion engine according to one embodiment of the present invention will now be described with reference to drawings.

Figure 1:
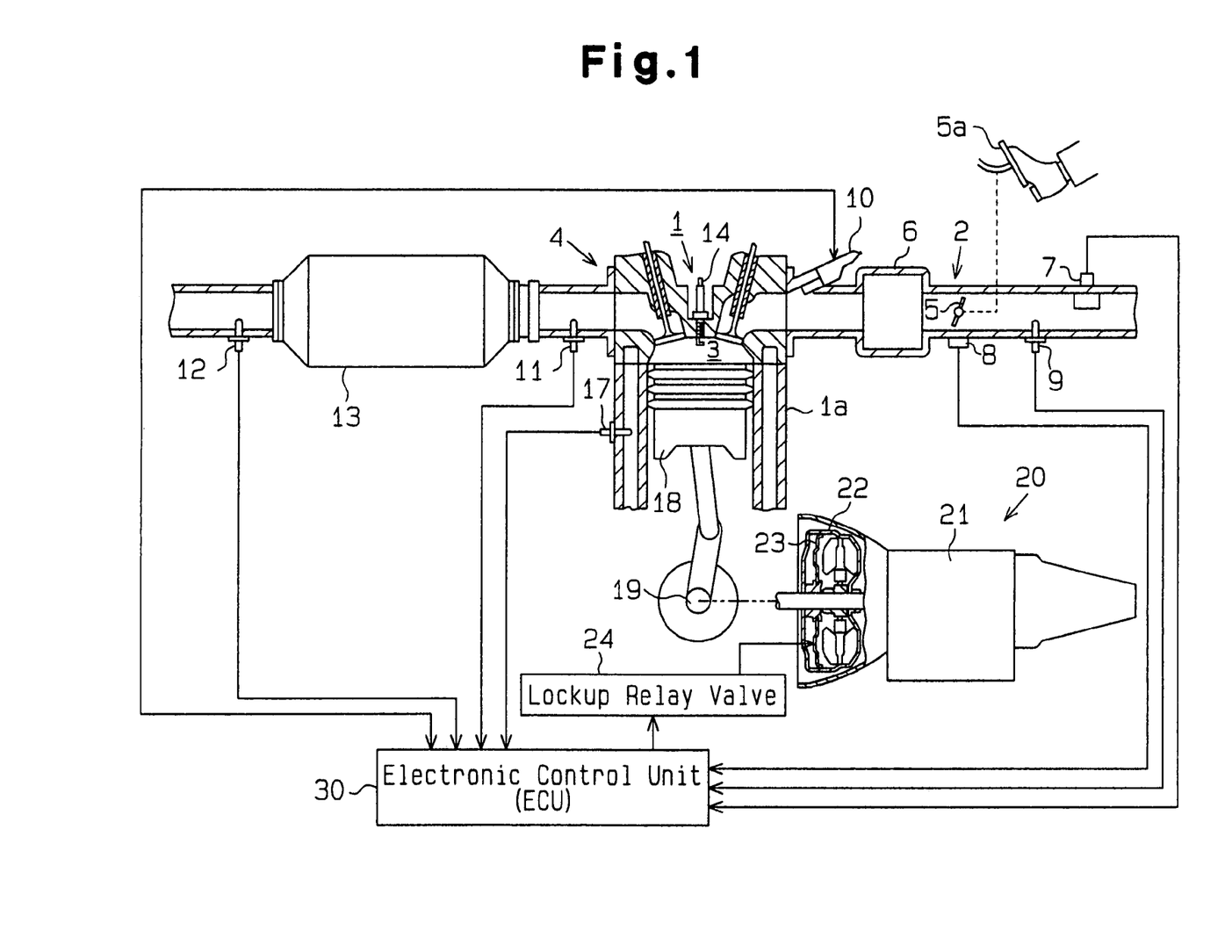
FIG. 1 is a schematic diagram illustrating an air-fuel ratio control apparatus according to one embodiment of the present invention.

FIG. 1 is a schematic diagram illustrating an internal combustion engine having the air-fuel ratio control apparatus according to the present embodiment.

As shown in FIG. 1, the internal combustion engine, which is a gasoline engine (hereinafter, simply referred to as engine) 1 in this embodiment, is coupled to an automatic transmission 20. The automatic transmission 20 includes an automatic transmission mechanism 21 and a fluid power transmission device, which is a torque converter 22 in this embodiment. The automatic transmission mechanism 21 has several gears, for example, first to fourth gears, and switches among these gears. The torque converter 22 transmits power between the engine 1 and the automatic transmission mechanism 21 through fluid (oil).

The engine 1 has pistons 18 and a crankshaft 19. The crankshaft 19 converts reciprocation of the pistons 18 into rotation. The torque converter 22 has a lockup clutch 23. The lockup clutch 23 directly couples and disconnects the automatic transmission mechanism 21 with the crankshaft 19.

The lockup clutch 23 is actuated based on hydraulic control performed by a lockup relay valve 24 and is switched between a coupled state for directly coupling the crankshaft 19 with an input shaft of the automatic transmission mechanism 21, and a released state for disengaging the crankshaft 19 from the input shaft. The lockup clutch 23 is also switched to a slipping state, which is an intermediate position between the coupled state and the released state. In the slipping state, the lockup clutch 23 permits the crankshaft 19 and the input shaft of the automatic transmission mechanism 21 to rotate relative to each other while partly coupling the crankshaft 19 and the input shaft.

An intake passage 2 of the engine 1 is connected to an air cleaner (not shown). A throttle valve 5 and a surge tank 6 are located in the intake passage 2. The throttle valve 5 is located upstream of the surge tank 6. The intake passage 2 has an intake flow rate sensor 7, a throttle position sensor 8, and an intake air temperature sensor 9.

Among these sensors, the intake flow rate sensor 7 is located upstream of the throttle valve 5 to detect an intake flow rate Q of air drawn into the engine 1. The throttle valve 5 is opened or closed according to depression of an acceleration pedal 5a. The throttle position sensor 8 includes an opening degree sensor and an idle switch. The opening degree sensor outputs information related to the opening degree of the throttle valve 5. The idle switch is turned on when the throttle valve 5 is fully closed. The intake air temperature sensor 9 detects a temperature of air drawn into the engine 1, or an intake temperature THA.

Fuel injection valves 10 are provided in the intake passage 2. Fuel is sent to the fuel injection valves 10 from a fuel tank (not shown) in a pressurized state. In response to actuation of the fuel injection valves 10, the fuel is injected and mixed with air supplied through the intake passage 2. The fuel is then supplied to combustion chambers 3 of the engine 1.

In an exhaust passage 4 of the engine 1, a three-way catalyst 13, an air-fuel ratio sensor 11 located upstream of the catalyst 13, and an oxygen sensor 12 located downstream of the catalyst 13 are provided.

The three-way catalyst 13 is capable of storing oxygen. The three-way catalyst 13 purifies carbon monoxide (CO), hydrocarbon (HC), and nitrogen oxides (NOx) in exhaust from the combustion chamber 3. That is, when the air-fuel ratio is lean, the catalyst 13 adsorbs excessive oxygen in exhaust gas from the engine 1. When the air-fuel ratio is rich, the catalyst 13 releases oxygen that compensates for a shortage of oxygen in the exhaust gas.

Figure 2:
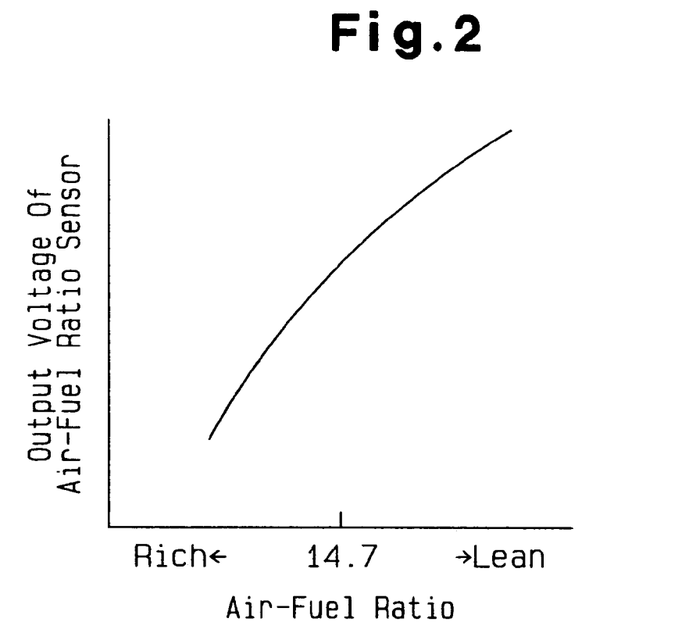
FIG. 2 is a graph showing the relationship between an air-fuel ratio and an output voltage of an air-fuel ratio sensor.
Figure 3:
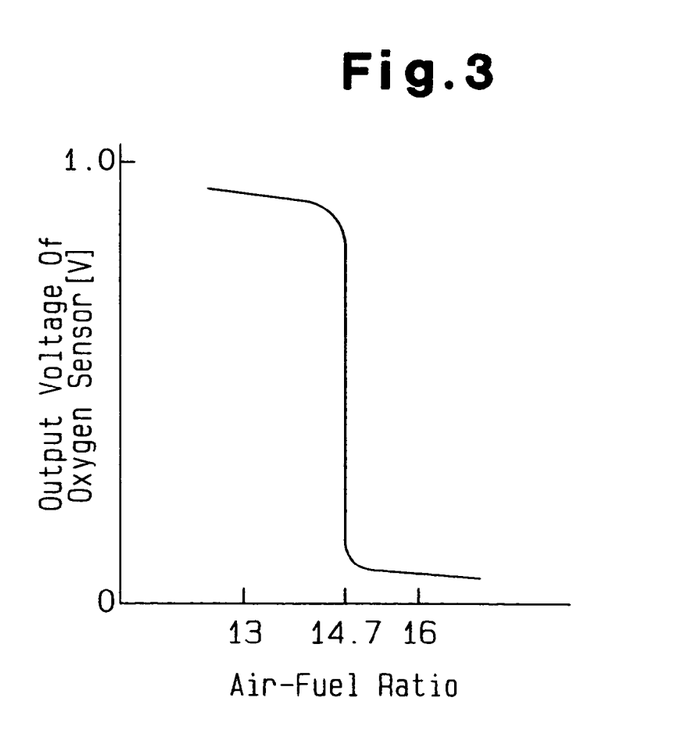
FIG. 3 is a graph showing the relationship between an air-fuel ratio and an output voltage of an oxygen sensor.

The air-fuel ratio sensor 11 detects the air-fuel ratio based on the concentration of oxygen in exhaust gas and outputs an output voltage that is linearly varied according to the air-fuel ratio as shown in FIG. 2. The oxygen sensor 12 detects whether the air-fuel ratio is richer or leaner than a stoichiometric air-fuel ratio based on the concentration of oxygen in exhaust gas as shown in FIG. 3 after the exhaust gas has passed through the three way catalyst 13.

The engine 1 has an igniter, an ignition coil, and ignition plugs 14. Each ignition plug 14 is located in the combustion chamber 3 of one of the cylinders. The igniter and the ignition coil generate ignition voltage that is applied to the ignition plugs 14.

The engine 1 is cooled by coolant circulating in a cylinder block 1a of the engine 1. The temperature of the coolant is detected by a coolant temperature sensor 17 provided in the cylinder block 1a.

Output of each of the above described sensors is sent to an electronic control unit (ECU) 30, which functions as a control system of the engine 1.

The ECU 30 is constructed with a microcomputer as the dominant constituent. The microcomputer incorporates a CPU, a ROM, a RAM, and a backup RAM. The ECU 30 is connected to the throttle position sensor 8, the intake flow rate sensor 7, the intake temperature sensor 9, the coolant temperature sensor 17, the air-fuel ratio sensor 11, and the oxygen sensor 12. The ECU 30 is also connected to the fuel injection valve 10 and the igniter.

Based on output from the sensors, the ECU 30 performs control of fuel injection and air-fuel ratio of the engine 1. The ECU 30 also performs various controls related to the automatic transmission 20. Likewise, based on detection results of the sensors, the ECU 30 controls the lockup relay valve 24 to switch the lockup clutch 23 among the coupled state and the released state, and the slipping state.

To effectively use the oxygen storing property of the three-way catalyst 13, the amount of oxygen stored in the catalyst 13 needs to be maintained to a predetermined amount (for example, half the maximum stored amount of oxygen) so that whether the air-fuel ratio of exhaust gas is rich or lean does not affect the catalyst 13. As long as the amount of oxygen stored in the catalyst 13 is maintained, constant adsorption and release of oxygen are always possible. As a result, the catalyst 13 always performs oxidation and reduction at desirable levels. Therefore, in this embodiment, the ECU 30 performs the air-fuel ratio control such that the amount of stored oxygen is constant, thereby maintaining the cleaning performance of the catalyst 13.

Figure 4:
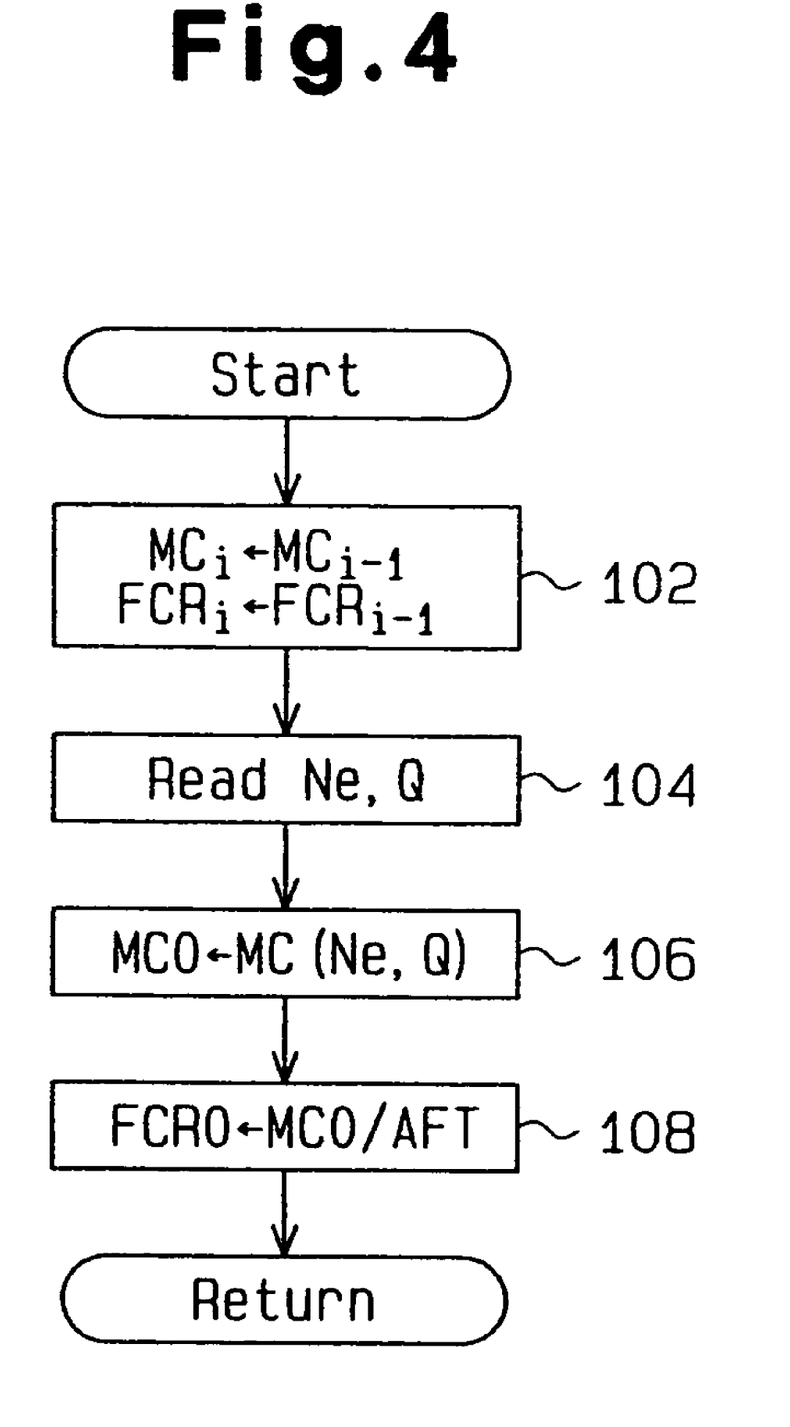
FIG. 4 is a flowchart showing a routine of computing a target in-cylinder fuel amount.

FIG. 4 is a flowchart of a routine for computing a target in-cylinder injection amount executed by the ECU 30. The ECU 30 executes the routine of FIG. 4 in an interrupting manner at predetermined crank angle increments.

When the routine is started, the ECU 30 renews an in-cylinder air amount MCi and in-cylinder target fuel amount FCRi (i=0 to n−1), in step 102, which have been computed in a previous execution of this routine. This is a procedure for computing a current in-cylinder air amount MC0 and a current target in-cylinder fuel amount FCR in the current execution of the routine. In step 104, the ECU 30 reads an engine speed Ne and an intake flow rate Q that are stored in the RAM.

In step 106, the ECU 30 computes the current in-cylinder air amount MC0 using the engine speed Ne and the intake flow rate Q a functions.

$$MC0=MC(Ne, Q)$$

In step 108, the ECU 30 computes an amount of fuel that is required for causing the air-fuel ratio to be a stoichiometric air-fuel ratio in the state of the current target in-cylinder fuel amount FCR0, or the current in-cylinder air amount MC0, by using the following equation.

$$FCR0=MC0/AFT$$

AFT is the stoichiometric air-fuel ratio (14.7).

Figure 5:
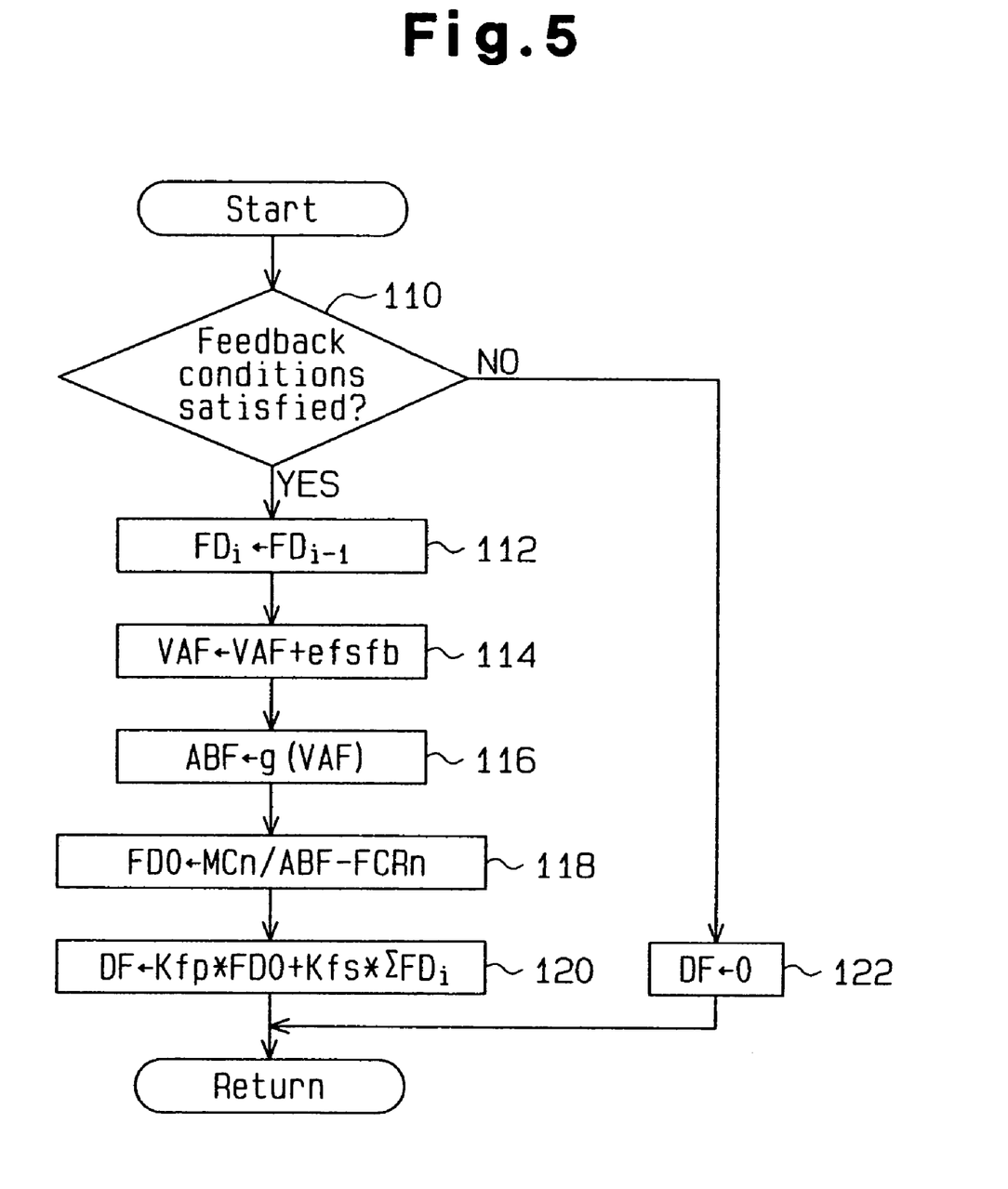
FIG. 5 is a flowchart showing a routine of a main air-fuel ratio feedback control.

FIG. 5 is a flowchart of a routine for air-fuel ratio feedback (F/B) control executed by the ECU 30. The ECU 30 executes the routine of FIG. 5 at predetermined crank angle increments.

When the routine is started, the ECU 30 determines whether feedback conditions by the air-fuel ratio sensor 11 are satisfied in step 110. The feedback control by the air-fuel ratio sensor 11 is permitted when the following conditions are all satisfied.

(1) The coolant temperature is no less than a predetermined temperature.

(2) The engine is not being cranked.

(3) The amount of fuel is not increased as in a fuel increase during cranking.

(4) The output of the air-fuel ratio sensor 11 has been reversed at least once.

(5) The fuel cutoff is not being performed.

When these conditions are all satisfied and the feedback control by the air-fuel ratio sensor 11 is permitted, the outcome of step 110 is positive. In this case, the ECU 30 proceeds to step 112, where the ECU 30 renews a fuel deviation amount FDi (i=1 to n) computed in a prior execution of the routine. The renewal of the fuel deviation amount FDi is for computing a current fuel deviation amount FD0 in the current execution of the routine.

In step 114, the ECU 30 corrects output VAF of the air-fuel ratio sensor 11 with a voltage correction value (sub-feedback correction value) efsfb. The voltage correction value efsfb is computed in a sub-air-fuel ratio feedback control routine, which will be discussed below.

$$VAF=VAF+efsfb$$

In step 116, the ECU 30 computes a current actual air-fuel ratio ABF based on the corrected output VAF of the air-fuel ratio sensor 11.

$$ABF=g(VAF)$$

In step 118, the ECU 30 computes the current fuel deviation amount FD0 based on an in-cylinder air amount MCn and a target in-cylinder fuel amount MCn computed in the nth execution before the current execution of the routine, and the current actual air-fuel ratio ABF.

$$FD0 = MCn/ABF - FCRn$$

The reason for using the in-cylinder air amount MCn and the target in-cylinder fuel amount FCRn of the nth execution of the routine before the current execution for computing the current fuel deviation amount FD0 is to correct a transport lag of exhaust gas from the cylinders to the air-fuel ratio sensor 11.

Lastly in step 120, the ECU 30 computes a fuel correction amount DF based on the following equation, and terminates the routine.

$$DF = Kfp \cdot FD0 + Kfs \cdot \Sigma FDi$$

Kfp represents a proportional gain, and Kfs represents an integral gain.

If any of the conditions (1) to (5) is not satisfied in step 110, the outcome is negative and the ECU 30 proceeds to step 122. In step 122 ECU 30 sets the fuel correction amount DF to zero and terminates the routine.

Figure 6:
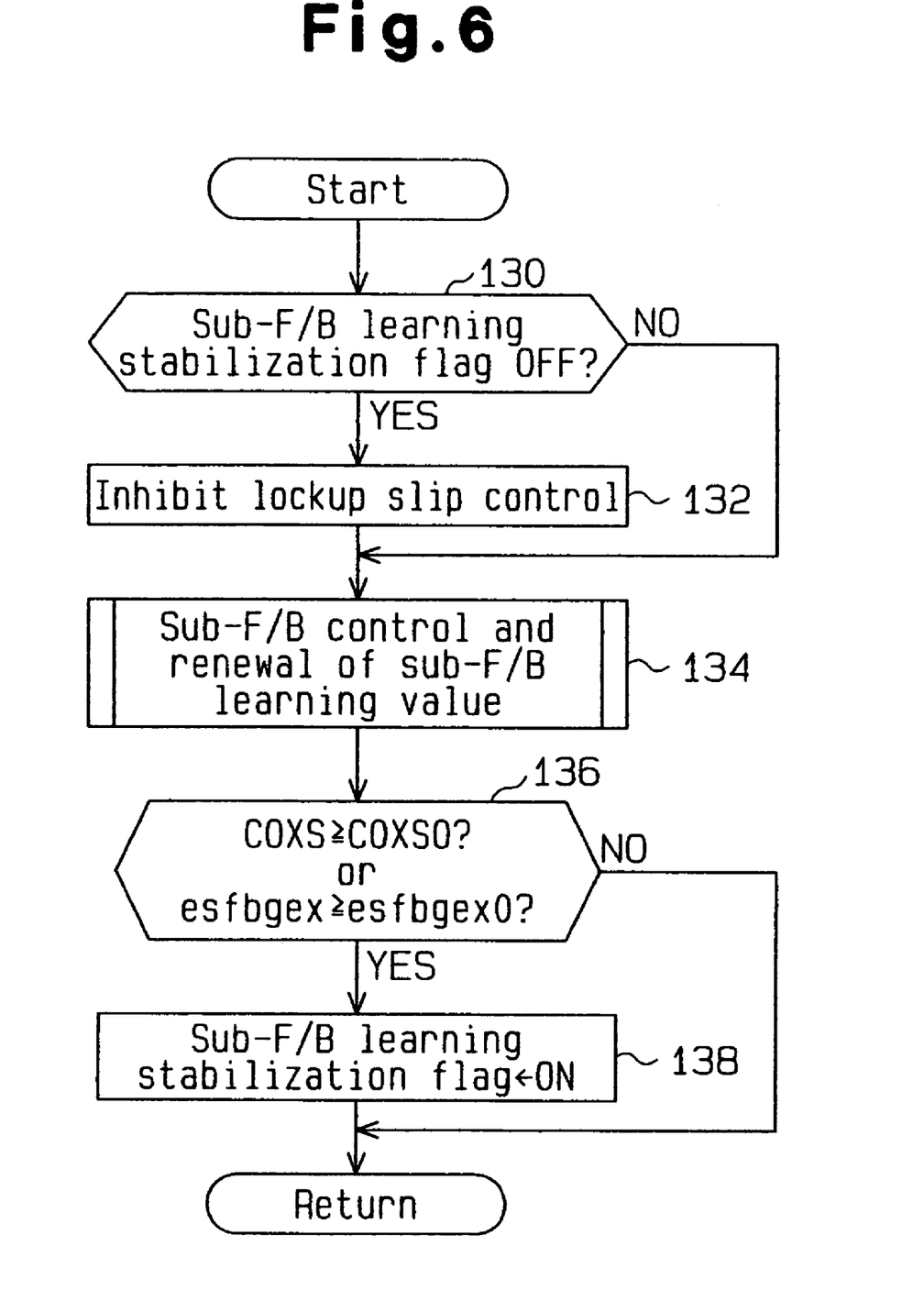
FIG. 6 is a flowchart showing a procedure of air-fuel ratio learning control according to the embodiment.
Figure 7:
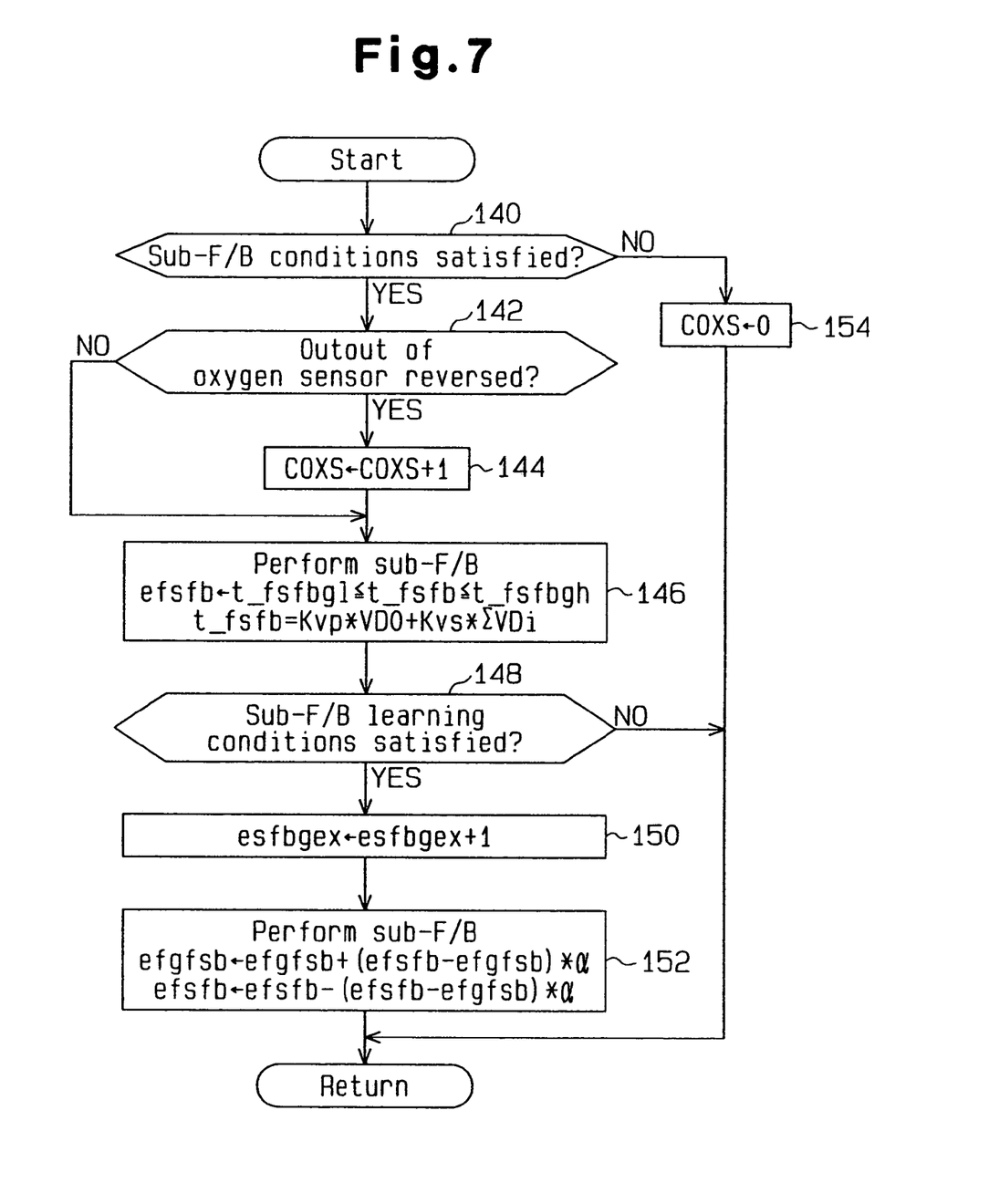
FIG. 7 is a flowchart showing a routine of a sub-air-fuel ratio feedback control.

FIGS. 6 and 7 are flowcharts showing a sub-air-fuel ratio feedback (F/B) control routine executed by the ECU 30. This routine includes a sub-F/B learning control. The ECU 30 executes the routine of FIGS. 6 and 7 in an interrupting manner at a predetermined time interval that is longer than the execution time of the main air-fuel ratio F/B control routine.

In step 130, the ECU 30 determines whether a sub-F/B learning stabilization flag is OFF. The sub-F/B learning stabilization flag is set OFF when the sub-F/B learning value is cleared as the electricity supply from the battery is stopped or when the RAM is broken. The sub-F/B learning stabilization flag is set ON when the sub-F/B learning is stabilized after the electricity supply from the battery is resumed. If the sub-F/B learning stabilization flag is determined to be OFF (negative outcome in step 130), the ECU 30 proceeds to step 132. If the sub-F/B learning stabilization flag is determined to be ON (positive outcome in step 130), the ECU 30 proceeds to step 134.

In step 132, the ECU 30 inhibits a slip control of the lockup clutch 23 even if the vehicle is decelerating. The ECU 30 also inhibits a fuel cutoff (F/C) control.

In step 134, the ECU 30 executes the sub-F/B control shown in FIG. 7 and the sub-F/B learning control.

As shown in FIG. 7, the ECU 30 determines whether a feedback condition by the oxygen sensor 12 is satisfied in step 140. That is, when all the conditions for the main F/B control are satisfied, the feedback control by the oxygen sensor 12 is permitted. When the feedback control by the oxygen sensor 12 is permitted, the outcome of step 140 is positive, and the ECU 30 proceeds to step 142. If the outcome of step 140 is negative, the ECU 30 sets an output reversal number COXS to zero in step 154.

In step 142, the ECU 30 determines whether the output of the oxygen sensor 12 has been reversed from one of a value representing a lean air-fuel ratio and a value representing a rich air-fuel ratio to the other value. If the output of the oxygen sensor 12 is determined not to have been reversed (negative outcome in step 142), the ECU 30 proceeds to step 146. If the output of the oxygen sensor 12 is determined to have been reversed (positive outcome in step 142), the ECU 30 proceeds to step 144. In step 144, the ECU 30 increments an output reversal number COXS, which represents the number of times the output of the oxygen sensor 12 has been reversed.

In step 146, the ECU 30 computes a provisional voltage correction value t_fsfb. The ECU 30 controls the provisional voltage correction value t_fsfb to be within a range between an upper limit value t_fsfbgh and a lower limit value t_fsfbgl, thereby obtaining the voltage correction value (sub-F/B correction value) efsfb. The ECU 30 then executes the sub-F/B control.

$$t\_fsfb = Kvp \cdot VD0 + Kvs \cdot \Sigma VDi$$

Kvp represents a proportional gain, and Kvs represents an integral gain. VD0 is a current voltage deviation between the output voltage of the oxygen sensor 12 and a target output voltage, $\Sigma VDi$ is an integrated value of the voltage deviation VDi of an execution of the routine that is before the previous execution.

Figure 11:
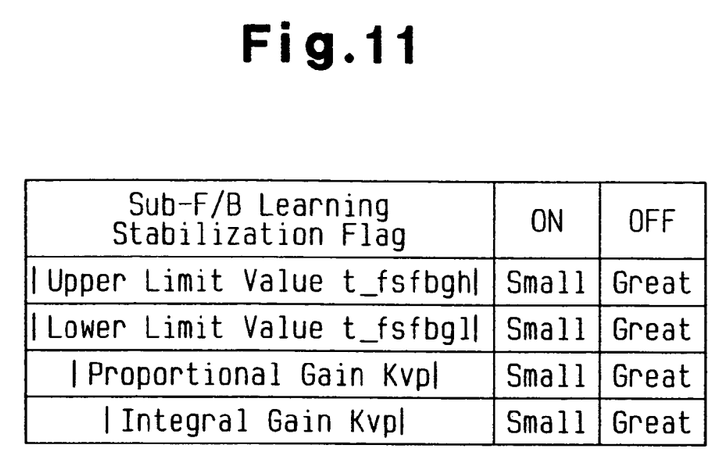
FIG. 11 is a map showing feedback gains and limit values of a sub-F/B correction value of the embodiment.

In step 146, the ECU 30 changes the proportional gain Kvp, the integral gain Kvs, the upper limit value t_fsfbgh, and the lower limit value t_fsfbgl based on the value of the sub-F/B learning stabilization flag by referring to a map shown in FIG. 11. That is, the values of the proportional gain Kvp, the integral gain Kvs, the upper limit value t_fsfbgh, and the lower limit value t_fsfbgl when the sub-F/B learning stabilization flag is OFF are set greater than those when the sub-F/B learning stabilization flag is ON.

In step 148, which is subsequent to step 146, the ECU 30 determines whether the sub-F/B learning condition is satisfied based whether a predetermined period has elapsed from when the fuel cutoff control is stopped. If the predetermined period has elapsed from stopping of the fuel cutoff control, the ECU 30 determines that the sub-F/B learning condition is satisfied. When determining that the sub-F/B learning condition is not satisfied (negative outcome of step 148), the ECU 30 temporarily suspends the routine. When determining that the sub-F/B learning condition is satisfied (positive outcome in step 148), the ECU 30 proceeds to step 150 and increments duration esfbgex of the sub-F/B control. The ECU 30 then proceeds to step 152.

In step 152, the ECU 30 renews the learning value efgfsb based on the following equation. The ECU 30 also renews the voltage correction value (sub-F/B correction value) efsfb by the correction amount of the learning value efgfsb, thereby performing the sub-F/B learning.

$$efgfsb \leftarrow efgfsb + (efsfb - efgfsb) \cdot \alpha$$

$$efsfb \leftarrow efsfb - (efsfb - efgfsb) \cdot \alpha$$

α represents an abating ratio.

In step 136 of FIG. 6, the ECU 30 determines whether the sub-F/B learning is stabilized based on whether the output reversal number COXS of the oxygen sensor 12 is no less than a predetermined number COXS0, or based on whether the duration esfbgex of the sub-F/B control is no less than a predetermined period esfbgex0. When determining that the output reversal number COXS of the oxygen sensor 12 is no less than the predetermined number COXS0, or when determining that the duration esfbgex of the sub-F/B control is no less than the predetermined period esfbgex0, the ECU 30 determines that the sub-F/B learning is stabilized. When determining that the sub-F/B is stabilized (positive outcome in step 136), the ECU 30 proceeds to step 138 and sets the sub-F/B learning stabilization flag to be ON, and terminates the routine.

Figure 8:
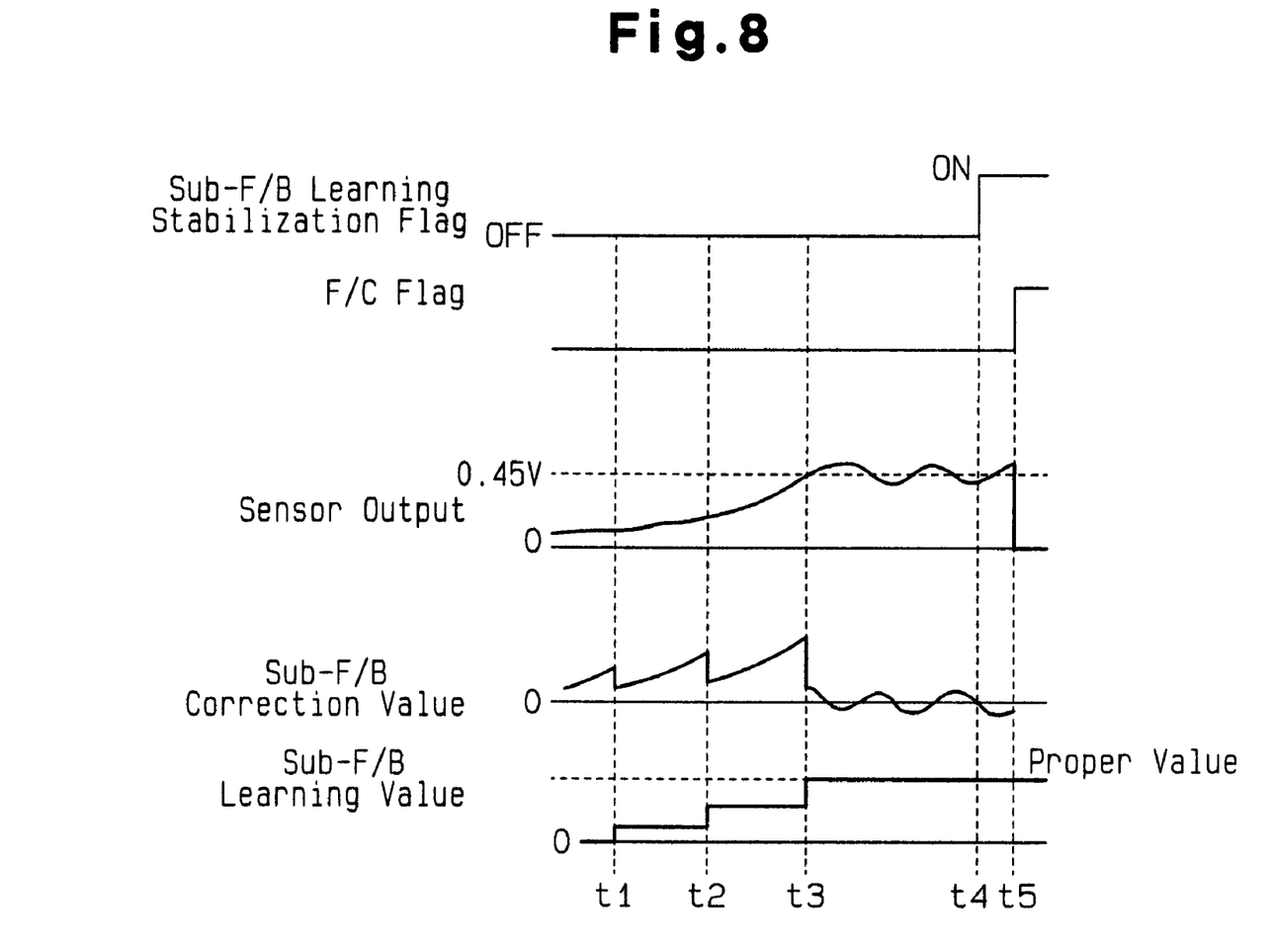
FIG. 8 is a timing chart showing a sub-F/B learning according to the embodiment.

FIG. 8 shows a state in which the ECU 30 executes learning of the sub-F/B learning value based on clearance of the sub-F/B learning value in this embodiment.

That is, when the sub-F/B control is continued for a predetermined period during the sub-F/B control at time t1, the sub-F/B learning is judged to be stable. Then, the sub-F/B learning value is renewed from an initial value (zero) by a predetermined amount based on the sub-F/B correction value. The sub-F/B correction value is reduced by an amount that corresponds to the correction amount of the sub-F/B learning value.

Even if the vehicle starts decelerating after time t1, since the sub-F/B learning stabilization flag is OFF, the slip control of the lockup clutch 23 is prohibited and the fuel cutoff (F/C) control is not executed. In this case, the main F/B control and the sub-F/B control are continued. Therefore, the oxygen sensor output does not seek the value representing a lean air-fuel ratio. That is, the oxygen sensor output has a predetermined value corresponding to the air-fuel ratio of exhaust gas.

When the sub-F/B control is continued for a predetermined period, the sub-F/B learning is determined to be stable at time t2. Then, the sub-F/B learning value is renewed by a predetermined amount based on the sub-F/B correction value. The sub-F/B correction value is reduced by an amount that corresponds to the correction amount of the sub-F/B learning value.

Even if the vehicle is decelerating after time t2, since the sub-F/B learning stabilization flag is OFF, the slip control of the lockup clutch 23 is inhibited and the fuel cutoff (F/C) control is not executed. In this case, the main F/B control and the sub-F/B control are continued. Therefore, the oxygen sensor output has a value corresponding to the air-fuel ratio of exhaust gas.

When the oxygen sensor output is reversed from a value representing a lean air-fuel ratio to a value representing a rich air-fuel ratio at time t3, the sub-F/B learning value is renewed by a predetermined value based on the sub-F/B correction value at the reversal. Accordingly, the sub-F/B learning value becomes a proper value that the sub-F/B learning value should originally has. The sub-F/B correction value is reduced by an amount that corresponds to the correction amount of the sub-F/B learning value.

After time t3, the output reversal number of the oxygen sensor reaches a predetermined number at time t4. At time t4, the sub-F/B learning stabilization flag is set ON. Accordingly, the slip control of the lockup clutch 23 is permitted.

After time t4, the vehicle starts decelerating at time t5. At time t5, the slip control of the lockup clutch 23 is executed, and the F/C control is executed.

In this manner, according to this embodiment, when the sub-F/B learning value is learned after the sub-F/B learning value is cleared, the slip control of the lockup clutch 23 is inhibited until the sub-F/B learning is stabilized and the sub-F/B learning stabilization flag is set ON. Also, the F/C is inhibited except when the engine speed is extremely high. Therefore, the main F/B control and the sub-F/B control can be continuously executed. Thus, the sub-F/B learning value has a proper value that the sub-F/B learning value should originally has based on the sub-F/B correction value, and the learning of the sub-F/B learning value is stabilized at an early stage. The sub-F/B learning value thus obtained is used in the main F/B control and the sub-F/B control. This prevents exhaust emission from deteriorating.

Figure 9:
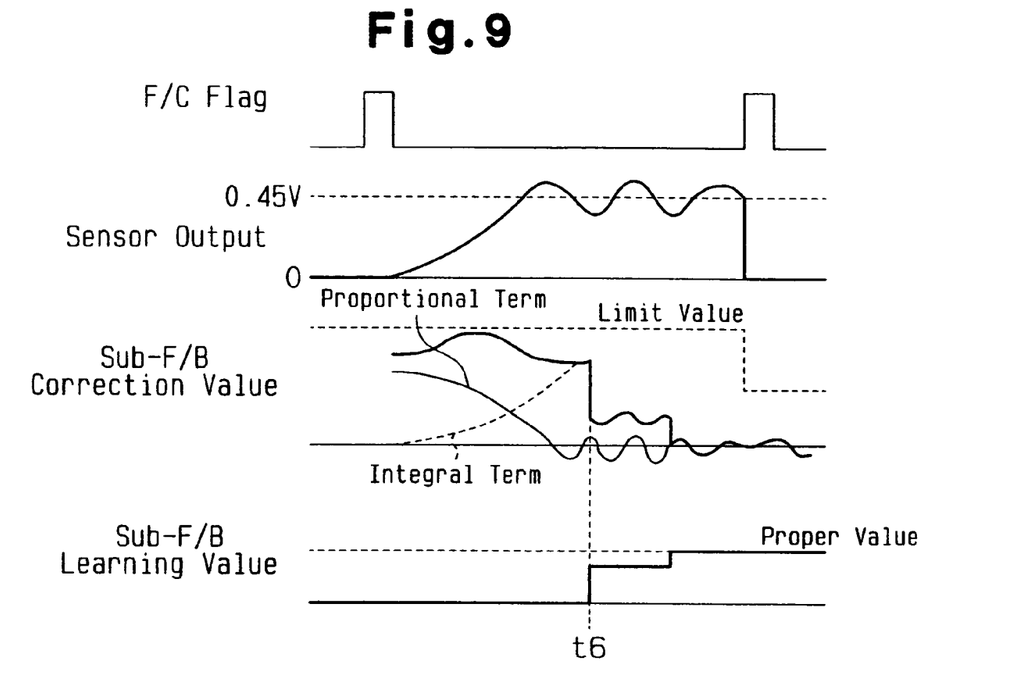
FIG. 9 is a timing chart showing a sub-F/B learning according to the embodiment.

FIG. 9 shows a state in which the ECU 30 executes learning of the sub-F/B learning value after clearance of the sub-F/B learning value in this embodiment. That is, the values of the proportional gain Kvp and the integral gain Kvs for computing the sub-F/B correction value, and the upper limit value t_fsfbgh, and the lower limit value t_fsfbgl for limiting the range of the sub-F/B correction value are set greater than those when the sub-F/B learning stabilization flag is ON.

That is, during the sub-F/B control, setting the proportional gain Kvp and the integral gain Kvs to be great values permits the proportional term and the integral term in the sub-F/B correction value to have great values. Accordingly, the sub-F/B correction value is changed by a great amount. A great amount of change in the sub-F/B correction increases the oxygen sensor output. This permits the output to be easily reversed. Setting the upper limit value t_fsfbgh and the lower limit value t_fsfbgl for limiting the range of the sub-F/B correction value to have great values increases the sub-F/B correction value. Therefore, when the sub-F/B learning is performed at time t6, the sub-F/B learning value is set to have a great value. Accordingly, the sub-F/B learning value is permitted to quickly seek a proper value that the sub-F/B learning value should originally has. The learning is therefore stabilized at an early stage.

Figure 10:
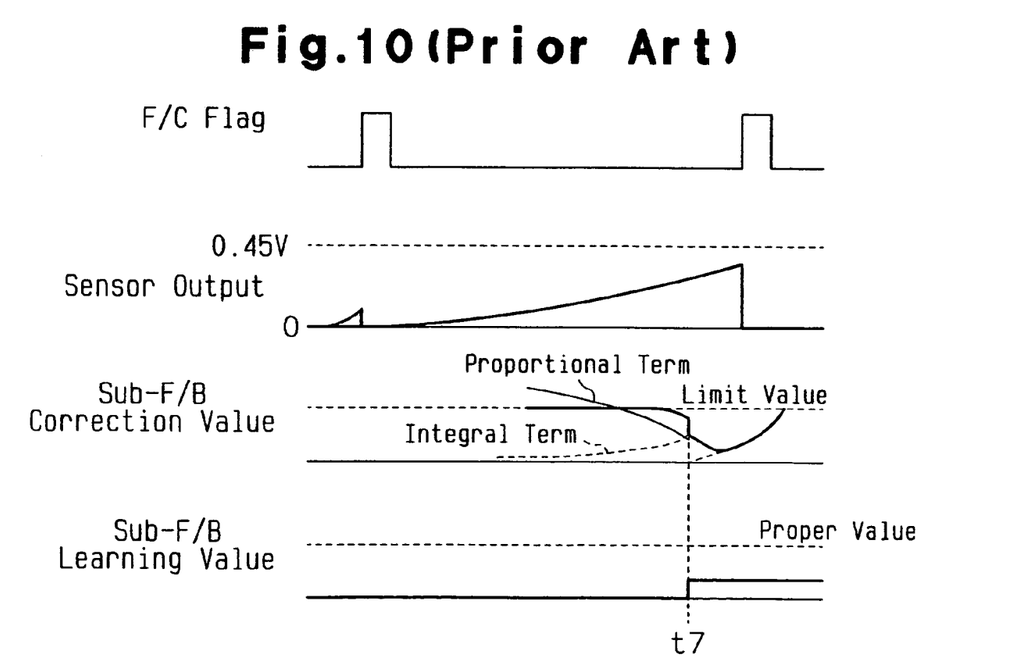
FIG. 10 is a timing chart showing a sub-F/B learning of the prior art.

FIG. 10 shows a state of a conventional sub-F/B control in which the values of the proportional gain Kvp, the integral gain Kvs, the upper limit value t_fsfbgh, and the lower limit value t_fsfbgl for limiting the range of the sub-F/B correction value are set smaller than those when the sub-F/B learning stabilization flag is OFF.

That is, during the sub-F/B control, setting the proportional gain Kvp and the integral gain Kvs to be small values permits the proportional term and the integral term in the sub-F/B correction value to have small values. Accordingly, the sub-F/B correction value is changed by a small amount. A small amount of change in the sub-F/B correction decreases the oxygen sensor output. This hinders the output from being easily reversed. Setting small values of the upper limit value t_fsfbgh and the lower limit value t_fsfbgl for limiting the range of the sub-F/B correction value decreases the sub-F/B correction value. Therefore, when the sub-F/B learning is performed at time t7, the sub-F/B learning value is set to have a small value. Accordingly, the sub-F/B learning value deviates from a proper value that the sub-F/B learning value should originally has. Therefore, if the sub-F/B control is executed based on the sub-F/B learning value thus computed, the accuracy of the air-fuel ratio is lowered. This degrades the exhaust emission.

It should be apparent to those skilled in the art that the present invention may be embodied in many other specific forms without departing from the spirit or scope of the invention. Particularly, it should be understood that the invention may be embodied in the following forms.

In the illustrated embodiment, a linear air-fuel ratio sensor is used as the air-fuel ratio sensor provided upstream of the three-way catalyst. However, an oxygen sensor may be used as the air-fuel ratio sensor located upstream of the catalyst. In other words, the present invention may be applied to a double oxygen sensor system. In this case, the output of the oxygen sensor does not proportionate to the amount of remaining oxygen in exhaust gas, and the fuel injection amount is not directly proportionate to the output of the upstream oxygen sensor. Therefore, the oxygen balance of the three-way catalyst cannot be predicted based on the integrated value of the fuel deviation amount. Thus, to predict the oxygen balance of the three-way catalyst, an integrated value of a deviation between an air-fuel ratio correction factor and an air fuel ratio learning value.

In the illustrated embodiment, the present invention is applied to a system having an automatic transmission with a torque converter that has a lockup clutch. However, the present invention may be applied to a system having a manual transmission.

In the illustrated embodiment, the present invention is applied to an engine 1, in which fuel is injected in the intake passage 2 by the fuel injection valve 10. However, the present invention may be applied to an engine in which fuel is directly injected in to the combustion chambers 3.

The illustrated embodiment may be modified such that the sub-F/B is determined to be stable when sub-F/B learning permission condition is satisfied a predetermined number of times.

Therefore, the present examples and embodiments are to be considered as illustrative and not restrictive and the invention is not to be limited to the details given herein, but may be modified within the scope and equivalence of the appended claims.

The invention claimed is:

1. An air-fuel ratio control apparatus for an internal combustion engine of a vehicle, the air-fuel ratio control apparatus comprising:
    an air-fuel ratio sensor located upstream of a three-way catalyst in an exhaust system of the internal combustion engine, wherein the air-fuel ratio sensor detects an engine air-fuel ratio based on a concentration of oxygen in exhaust gas; and
    an oxygen sensor located downstream of the three-way catalyst, wherein the oxygen sensor detects the engine air-fuel ratio based on the concentration of oxygen in exhaust gas,
    wherein the control apparatus:
    performs feedback control of an amount of fuel based on output of the air-fuel ratio sensor such that the engine air-fuel ratio seeks a stoichiometric air-fuel ratio;
    performs sub-feedback control by computing a sub-feedback correction value based on output of the oxygen sensor, wherein the sub-feedback correction value corrects the fuel amount in the feedback control;
    learns a learning value based on the sub-feedback correction value, wherein the learning value is used for compensating for a stationary difference between the stoichiometric air-fuel ratio and the engine air-fuel ratio, which stationary difference is based on output characteristics of the air-fuel ratio sensor;
    stores the learning value;
    executes fuel cutoff control in a predetermined period; and
    inhibits the fuel cutoff control until the learning is stabilized when learning of the stored learning value is performed after the stored learning value is cleared.

2. The air-fuel ratio control apparatus according to claim 1, further comprising a fluid power transmission having a lockup clutch, wherein the lockup clutch couples the internal combustion engine and an automatic transmission to each other, wherein, during deceleration of the vehicle, the air-fuel ratio control apparatus causes the lockup clutch to operate in a slipping state, and wherein, when learning of the learning value is performed after the stored learning value is cleared, the air-fuel ratio control apparatus inhibits the lockup clutch from operating in a slipping state until the learning is stabilized.

3. The air-fuel ratio control apparatus according to claim 1, wherein, when learning of the learning value is performed after the stored learning value is cleared, the air-fuel ratio control apparatus changes a feedback gain, which is used for computing the sub-feedback correction value, to a value that is greater than a value of the feedback gain used after the learning is stabilized.

4. The air-fuel ratio control apparatus according to claim 1, wherein, when learning of the learning value is performed after the stored learning value is cleared, the air-fuel ratio control apparatus increases a limit value of the sub-feedback correction value compared to a limit value used after the learning is stabilized.

5. The air-fuel ratio control apparatus according to claim 1, wherein, when learning of the learning value is performed after the stored learning value is cleared, the air-fuel ratio control apparatus determines that the learning is stabilized based on that the number of times of output reversal of the oxygen sensor reaches a predetermined number of times during the sub-feedback control.

6. The air-fuel ratio control apparatus according to claim 1, wherein, when learning of the learning value is performed after the stored learning value is cleared, the air-fuel ratio control apparatus determines that the learning is stabilized based on that a predetermined period has elapsed from the start of the sub-feedback control.

7. The air-fuel ratio control apparatus according to claim 1, wherein, when learning of the learning value is performed after the stored learning value is cleared, the air-fuel ratio control apparatus changes the absolute value of a feedback gain, which is used for computing the sub-feedback correction value, or the absolute value of a limit of the sub-feedback correction value to a value that is greater than a value of the feedback gain or the feedback correction value limit used after the learning is stabilized.

8. The air-fuel ratio control apparatus according to claim 7, wherein the air-fuel ratio sensor detects the air-fuel ratio based on the concentration of oxygen in exhaust gas and outputs an output voltage that is linearly varied according to the air-fuel ratio.

* * * * *

UNITED STATES PATENT AND TRADEMARK OFFICE
CERTIFICATE OF CORRECTION

PATENT NO. : 7,096,663 B2  Page 1 of 1
APPLICATION NO. : 10/823710
DATED : August 29, 2006
INVENTOR(S) : Mitsutani et al.

It is certified that error appears in the above-identified patent and that said Letters Patent is hereby corrected as shown below:

| Column | Line | |
|---|---|---|
| 1 | 29-30 | Change "sto- ichiometric" to --stoi- chiometric--. |
| 1 | 57-58 | Change "sto- ichiometric" to --stoi- chiometric--. |
| 2 | 9 | Before "needs" insert --control--. |
| 3 | 7 | Change " has" to --have--. |
| 6 | 19 | Before "functions" delete "a". |
| 9 | 57 | Change "has" to --have--. |
| 10 | 19 | Change "has" to --have--. |
| 10 | 41 | Change "has" to --have--. |
| 10 | 57 | Change "does" to --is--. |

Signed and Sealed this

Thirteenth Day of February, 2007

JON W. DUDAS
*Director of the United States Patent and Trademark Office*